(12) United States Patent
Syllaios et al.

(10) Patent No.: US 6,297,511 B1
(45) Date of Patent: Oct. 2, 2001

(54) HIGH FREQUENCY INFRARED EMITTER

(75) Inventors: Athanasios J. Syllaios, Richardson; Roland W. Gooch, Dallas; William L. McCardel, Plano; Thomas R. Schimert, Ovilla, all of TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/283,669

(22) Filed: Apr. 1, 1999

(51) Int. Cl.[7] .................................. H05B 3/20; H05B 3/26
(52) U.S. Cl. ...................................... 250/495.1; 250/494.1; 250/493.1; 250/504 R
(58) Field of Search ............................. 250/495.1, 494.1, 250/493.1, 504 R, 338.1

(56) References Cited

U.S. PATENT DOCUMENTS

| | | | |
|---|---|---|---|
| 5,486,698 | 1/1996 | Hanson et al. | 250/332 |
| 5,512,748 | 4/1996 | Hanson | 250/332 |
| 5,602,043 | 2/1997 | Beratan et al. | 437/3 |
| 5,864,144 | * 1/1999 | Laine | 250/504 R |
| 5,910,659 | * 6/1999 | Johnson et al. | 250/495.1 |
| 5,939,726 | * 8/1999 | Wood | 250/504 R |

OTHER PUBLICATIONS

Carlos H. Mastrangelo, James Hsi–Jen Yeh, and Richard S. Muller, "Electrical and Optical Characteristics of Vacuum–Sealed Polysilicon Microlamps," *IEEE Transactions on Electron Devices*, vol. 39, No. 6, pp. 1363–1375, Jun. 1992.

* cited by examiner

Primary Examiner—Bruce Anderson
Assistant Examiner—Nikita Wells
(74) Attorney, Agent, or Firm—Baker Botts L.L.P.

(57) ABSTRACT

An infrared radiation emitter is provided that is capable of producing infrared radiation modulating at high frequency. The IR emitter includes a low-thermal-mass resistive membrane that is suspended by long thermal isolation arms over a substrate. The membrane is suspended over the substrate such that a resonant emitting cavity is formed between the membrane and the substrate. The low-mass, thermally isolated membrane design maximizes the temperature change induced by Joule heating of the resistive membrane and allows the emitted IR radiation to be modulated at high frequencies.

24 Claims, 2 Drawing Sheets

HIGH FREQUENCY INFRARED EMITTER

TECHNICAL FIELD OF THE INVENTION

This invention relates generally to infrared emitters and infrared imaging systems, and more particularly to a high frequency infrared emitter.

BACKGROUND OF THE INVENTION

Infrared (IR) imaging systems are often employed to detect objects such as fires, planes, vehicles and people, and to control temperature sensitive industrial processes. A specific type of IR imaging systems, thermal imaging systems, generally operate by detecting the differences in thermal radiance of various objects in a scene and by displaying the differences as a visual image of the scene.

The basic components of a thermal imaging system generally include optics for collecting and focusing IR radiation from a scene, a thermal detector having a plurality of thermal sensors for converting IR radiation to an electrical signal, and electronics for amplifying and processing the electrical signal into a visual display or for storage in an appropriate medium. A chopper may be included in the thermal imaging system to provide a reference signal indicating the amount of background radiation being received by the detector. Choppers may periodically interrupt the transmission of IR radiation to the detector in order to provide this reference signal. For example, the chopper may be a rotating disk with openings that intermittently block incoming IR radiation.

In order to detect and create an image of an object, thermal imaging systems generally rely on infrared radiation that is either emitted by that object or that is reflected off the object. Thermal imaging systems may include a infrared source that emits IR radiation. Such an IR emitter can be used to actively create an image of an object by reflecting IR radiation off of the object and to the thermal detector(s) of the imaging system.

SUMMARY OF THE INVENTION

In many applications, an IR emitter is required that can produce intermittent pulses of IR radiation. Such an IR emitter might be used to replace a mechanical chopper in a thermal imaging system. In order for such an imaging system to have good detectivity, the pulses of IR radiation are preferably produced at a high frequency. Accordingly, a need has arisen for an IR emitter that is capable of producing IR radiation modulating at high frequencies. The present invention provides a high frequency infrared emitter that meets this need.

According to one aspect of the present invention, an IR emitter is provided that is capable of producing infrared radiation modulating at high frequency. This modulating frequency may be selected by the operator. The IR emitter includes a resistive membrane having a low thermal mass. The membrane is suspended by thermal isolation arms over a substrate such that a resonant emitting cavity is formed between the membrane and the substrate. The low thermal mass, thermally isolated membrane design maximizes the temperature change induced by Joule heating of the resistive membrane and allows the emitted IR radiation to be modulated at selected high frequencies.

IR emitters incorporating the present invention may function as broadband near-IR and mid-IR sources that can be electrically modulated at frequencies on the order of one hundred to one thousand hertz, both in emission intensity and spatially. IR emitters incorporating the teachings of the present invention can be used in gas or liquid sensors and various other spectroscopic applications, IR signal or pattern generation, and IR displays.

Embodiments of the present invention provide numerous technical advantages. IR emitters incorporating teachings of the present invention are capable of providing electronic chopping of emitted IR radiation at frequencies greater than one hundred Hertz. Furthermore, in one embodiment of the present invention, the use of a resonant emitting cavity provides the IR emitter with an emissivity of greater than eighty percent. Another advantage of IR emitters incorporating teachings of the present invention is the ability to emit IR radiation over a broad spectral band. For example, one embodiment of the present invention is operable to emit IR radiation with a wavelength of three to fourteen micrometers ($\mu$m).

Yet another technical advantage of IR emitters incorporating the teachings of the present invention is their high efficiency due to the efficient thermal isolation of the emitter. In addition, embodiments of the present invention can be surface micromachined using a micro-electromechanical systems (MEMS) process.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 5 of the drawings, like numerals being used for like and corresponding parts of the various drawings.

Figure 1:
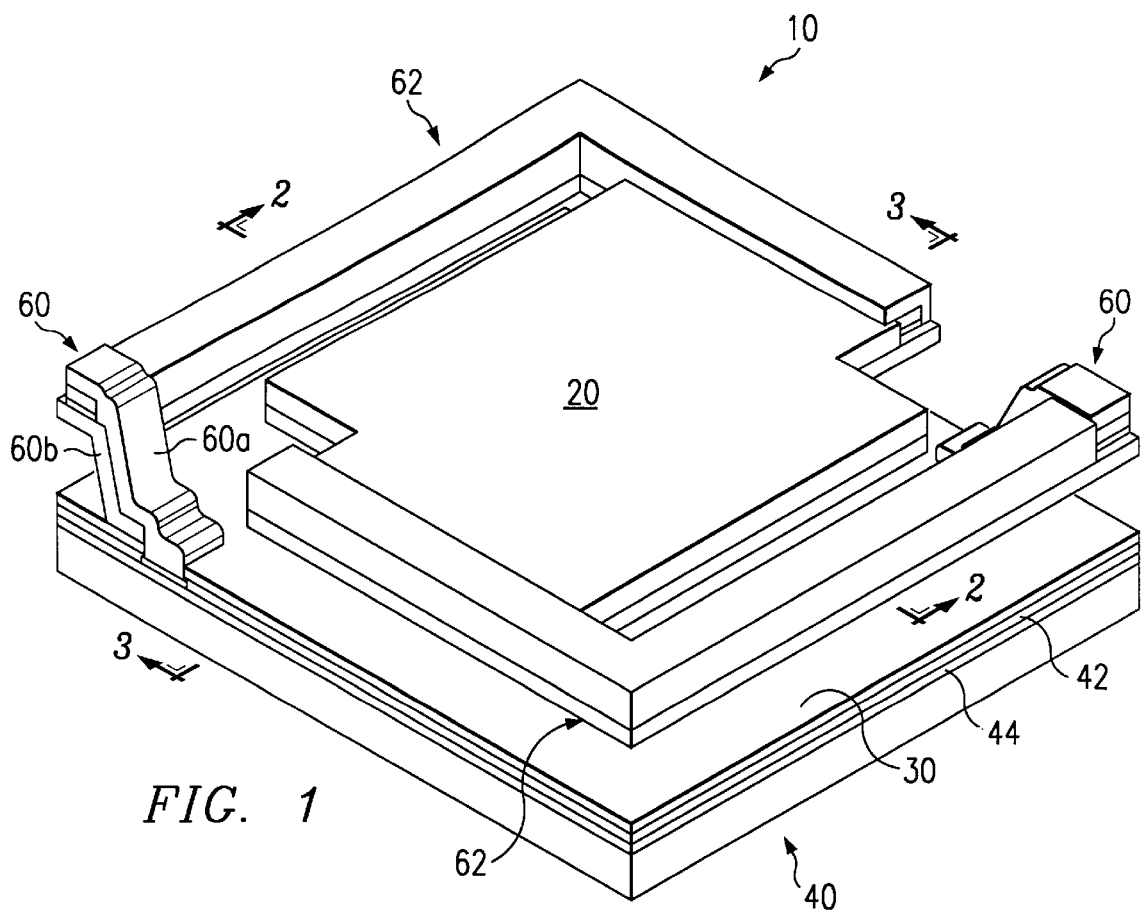
FIG. 1 is a schematic drawing showing an isometric view of an infrared emitter incorporating teachings of the present invention.
Figure 2:
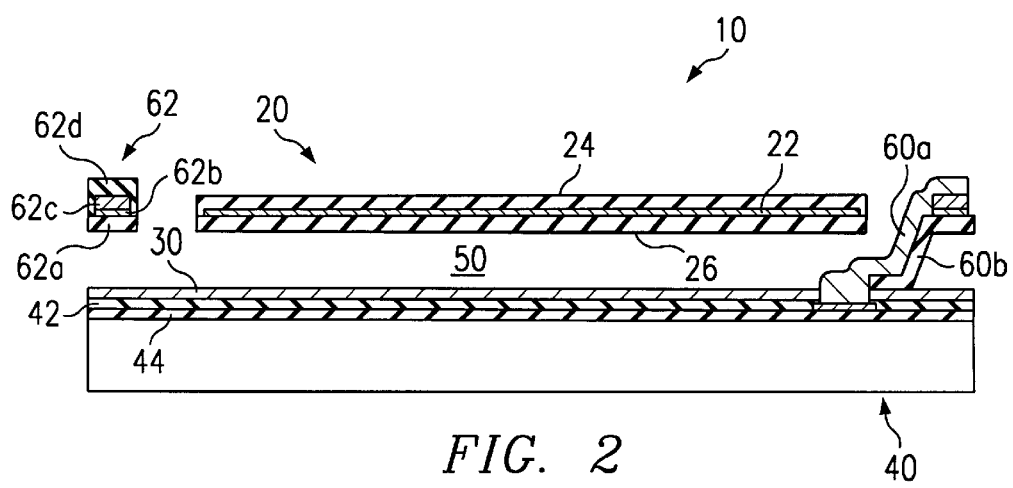
FIG. 2 is a schematic drawing in section and in elevation of the infrared emitter of FIG. 1 taken along line 2—2.
Figure 3:
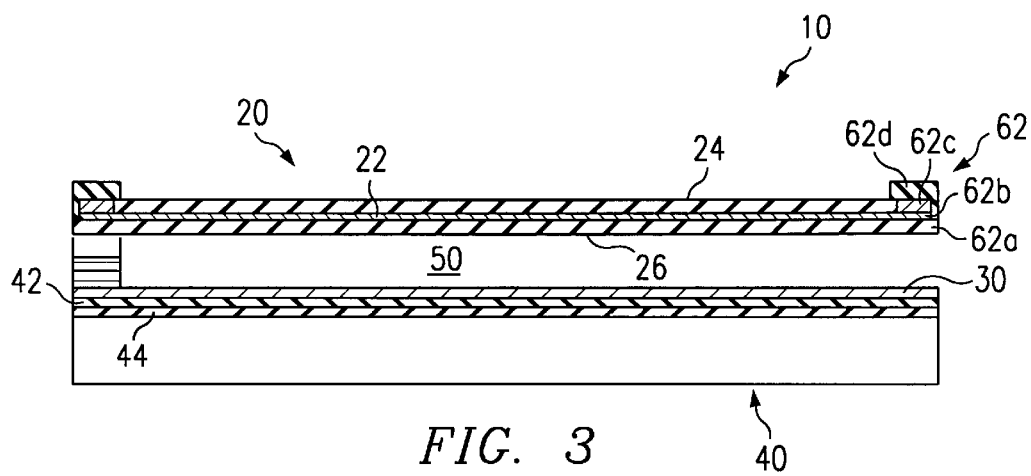
FIG. 3 is schematic drawing in section and in elevation of the infrared emitter of FIG. 1 taken along line 3—3.

FIG. 1 is a schematic diagram showing a cross-section of an infrared (IR) emitter 10 incorporating teachings of the present invention. FIGS. 2 and 3 are schematic drawings in elevation showing cross-sections of IR emitter 10 taken along lines 2—2 and 3—3, respectively, of FIG. 1. Referring now to FIGS. 1–3, IR emitter 10 includes a low-thermal-mass membrane 20 suspended above a reflective surface or reflector 30. Reflector 30 is coupled to one surface of a substrate 40.

Membrane 20 may include three layers. A thin emitter layer 22 is disposed between an upper insulator layer 24 and a lower insulator layer 26. Emitter layer 22 is used to generate IR radiation. The process of generating such radiation will be discussed below. Emitter layer 22 may be contiguous and have a generally rectangular shape. Emitter layer 22 may also be shaped in other ways so as to optimize the electrical power dissipation and the temperature distribution of membrane 20. For example, emitter layer 22 may consist of a set of strips connected in parallel between a pair of conductor arms 62, or connected in series to form a meandering resistive path between conductor arms 62. Emitter layer 22 may alternatively be a layer containing apertures that are positioned so as to optimize the temperature uniformity of emitter layer 22. It will be understood that emitter layer 22 may have any form suitable for generating IR radiation without departing from the scope of the present invention.

In one embodiment of the present invention, the thickness of emitter layer 22 is approximately 150 Å. Emitter layer 22 is preferably made from titanium (Ti), however, other materials may be used such as low conductivity metals or alloys like tungsten (W), nickel (Ni), and nichrome; or semiconductors such as crystalline silicon (Si), polycrystalline silicon, amorphous silicon, and silicon carbide (SiC). Insulator layers 24 and 26 are preferably comprised of silicon nitride. Other materials may be used, however, such as silicon dioxide ($SiO_2$) and silicon carbide (SiC), among others. In one embodiment of the present invention, insulator layers 24 and 26 are each approximately 250 Å in thickness. One purpose of insulator layers 24 and 26 is to provide chemical passivation and mechanical support for emitter layer 22.

Membrane 20 preferably includes materials that have a low thermal mass so that membrane 20 will radiate the majority of heat that is generated within emitter layer 22. This generated heat is preferably radiated as IR radiation. Membrane 20 also has high thermal isolation due to the design of support legs 60 and conductor arms 62, discussed below. The importance of the low thermal mass and high thermal isolation of membrane 20 will also be discussed below.

Membrane 20 is suspended over reflector 30 such that a cavity 50 is formed between membrane 20 and reflector 30. Reflector 30 preferably includes aluminum (Al), however any other suitable reflective materials may be used. Substrate 40, on which reflector 30 is affixed, is preferably comprised of silicon (Si). Substrate 40 may also include one or more layers 42 and 44 of silicon dioxide ($SiO_2$), or other materials typically associated with the fabrication of integrated circuits.

The depth of cavity 50 between reflector 30 and membrane 20 may be sized to produce a desired frequency of IR radiation. For example, cavity 50 may be sized so that IR emitter 10 produces IR radiation at a frequency that can be detected by a corresponding IR detector (not explicitly shown). More specifically, cavity 50 can be sized to emit IR radiation in the mid-wavelength infrared (MWIR) window, which is the 3 micron to 5 micron wavelength range, and the long wavelength infrared (LWIR) window, which is the 8 micron to 12 micron wavelength range. Emitter 10 may also emit IR radiation having wavelengths longer than 12 microns if desired.

In addition, by selectively positioning membrane 20 over reflector 30, a resonant cavity may be created. An electric field is created in cavity 50 when electric current is passed through emitter layer 22. The magnitude of the IR radiation emitted from emitter layer 22 is maximized if the electric field reaches its maximum value coincident with the plane of emitter layer 20. In order to maximize the emitted radiation, emitter layer 22 is placed at a distance from reflector 30 such that it is at an antinode of the electric field created in cavity 50. In this manner a resonant cavity is formed.

The location of the first antinode above reflector 30 can be found as follows. For a distance equal to one wavelength, there are two antinodes where the electric field is at a maximum, and three nodes where the field is zero. The first and second nodes are located at each end of the wavelength, and the third node is located directly between these nodes at the half wavelength. The antinodes are located halfway between the nodes, or at the quarter wavelength and the three-quarters wavelength. At reflector 30, the electric field vanishes, thus a node is located at this point. Therefore, an antinode occurs at a distance approximately equal to L/4 above reflector 30, where L is the wavelength of the incident radiation.

Therefore, if emitter layer 22 is placed at a distance above reflector 30 equal to one quarter of the emitted radiation's wavelength, then the magnitude of the emitted radiation will be maximized. When emitter layer 22 is so positioned, the depth of cavity 50 is one-quarter of a wavelength. This is known as a quarterwave cavity. In addition, if emitter layer 22 is thin compared to the radiation wavelength, then the electric field has the same maximum value at the top and bottom surfaces of emitter layer 22. In the present invention this is true, since membrane 20 is several hundred times thinner than the wavelength of the emitted IR radiation. Therefore, in an embodiment of the present invention incorporating a quarterwave cavity, the radiation emitted from both the top and bottom surfaces of emitter layer 22 will be maximized.

Membrane 20 is supported over reflector 30 and substrate 40 by a pair of support legs 60 and the pair of conductor arms 62. Support legs 60 are comprised of a conductive layer 60a that is used to conduct electrical current to and from conductor arms 62. Conductive layer 60a may be fabricated from aluminum (Al), however, other conductive metals or alloys such as a titanium-aluminum alloy or copper may be used. In addition, the same metals and alloys from which emitter layer 22 may be formed can be also used to fabricate conductive layer 60a. In such cases, conductive layer 60a will generally be at least twice as thick as emitter layer 22 in order to have high electrical conductivity.

Conductive layer 60a is a primary component of support legs 60, however, support legs 60 may optionally include a support layer 60b. Support layer 60b is used to add mechanical rigidity to support legs 60. For ease of fabrication, support layer 60b may be fabricated from the same material as lower insulator layer 26 of membrane 20. In fact, in the embodiment shown in FIGS. 1–3, insulator layer 26 extends not only under emitter layer 22 of membrane 20, but also under conductor arms 62 and support legs 60. Therefore, one continuous layer of material may be used. In one embodiment, this material is silicon nitride (SiN), however, other suitable materials may be used.

A conductor arm 62 is coupled to each support leg 60. Conductor arms 62 are used to support membrane 20 over substrate 40 and to conduct electrical current to and from membrane 20. Like support legs 60, conductor arms 62 may be comprised of only a conductive layer 62c. However, in the embodiment shown in FIGS. 1–3, the same three layers that comprise membrane 20 (emitter layer 22 and insulator layers 24 and 26) are also included in conductor arms 62. In such an embodiment, lower insulator layer 26 and emitter layer 22 of membrane 20 extend from membrane 20 to form the lower insulator layer 62a and emitter layer 62b, respectively, of conductor arms 62. It should be noted that even though conductor arms 62 include an emitter layer 62*b*, any IR radiation emitted from this layer is absorbed by conductive layer 62*c*. It is membrane 20, not conductor arms 62, that functions to emit IR radiation.

The next layer of conductor arms 62 is conductive layer 62*c*. Conductive layer 62*c* may be fabricated from the same type of materials from which conductive layer 60*a* of support legs 60 is fabricated. Conductive layer 62*c* is electrically coupled to conductive layer 60*a* of support legs 62 and extends through conductor arms 62 until it abuts upper insulator layer 24 along one side of membrane 20. At this point, conductive layer 62*c* conducts any electric current passing through it to emitter layer 22 of membrane 20. It should be noted that since conductive layer 62*c* may be fabricated from an electrically conductive material (like emitter layer 22 of membrane 20), emitter layer 62*b* of conductor arms 62 may also conduct electrical current through conductor arms 62 to emitter layer 22. However, conductive layer 62*c* has the primary function of conducting electrical current through conductor arms 62.

The final layer of conductor arms is an upper insulator layer 62*d*. Upper insulator layer 62*d* extends from support legs 60 to membrane 20. Upper insulator layer 62*d* encapsulates conductive layer 62*c* and emitter layer 62*b* and joins with lower insulator layer 62*a*. Along each side of membrane 20, upper insulator layer 62*d* slightly overlaps upper insulator layer 24 of membrane 20. At its opposite end, upper insulator layer 62*d* terminates at support legs 60, so that conductive layer 62*c* of conductor arms 62 will directly contact conductive layer 60*a* of support arms 60.

Emitter layer 22 of membrane 20 is supplied with electric current from a power source that may be embedded in substrate 40. This electric current is conducted to membrane 20 via support legs 60 and conductor arms 62. Thus, support legs 60 and conductor arms 62 should be fabricated from at least one layer of material having low electrical resistance. This characteristic is provided by conductive layers 60*a* and 62*c*. This low electrical resistance is due to the conductive characteristics of the material of which conductive layers 60*a* and 62*c* are made, and the relative thickness of layers 60*a* and 62*c* as compared to emitter layer 22 of membrane 20. Although conductive layers 60*a* and 62*c* may be made from the same material as emitter layer 22, the difference in their thicknesses and width allows electricity to be conducted by conductive layers 60*a* and 62*c*, but dissipated in emitter layer 22.

Support legs 60 and conductor arms 62 should also be designed so that they have high thermal resistance. A design that has high thermal resistance is desired because in order to be effective, membrane 20 needs to be thermally isolated. Due to the low thermal mass of membrane 20, membrane 20 is a much more effective emitter of IR radiation than support legs 60 and conductor arms 62. Therefore, is not desirable for heat to be transferred from membrane 20 other than by IR radiation emitted by membrane 20. The property of high thermal resistance in conductor arms 62 and support legs 60 is accomplished in the embodiment shown in FIGS. 1–3 by designing support legs 60 and conductor arms 62 so that they are thin. In addition, conductor arms 62 are also designed to have a large length as compared to their width. These geometric characteristics prevent conductor arms 62 and support legs 60 from conducting much heat to or from membrane 20.

Finally, support legs 60 and conductor arms 62 should have enough mechanical rigidity to support membrane 20 over substrate 40. The combination of all of the layers in support legs 60 and conductor arms 62 provides the mechanical rigidity needed to support membrane 20.

The process of emitting IR radiation is begun by directing electric current through one support leg 60 and conductor arm 62 to emitter layer 22. The electrical current flows up one support leg 60 and down the other, and may be made to flow in either direction. Once the electric current reaches emitter layer 22, the electrical current is dissipated in emitter layer 22 because of its relative thinness. The dissipation of the electrical power raises the temperature of membrane 20 and causes IR radiation to be emitted. Specifically, the IR emission results from membrane 20 being Joule-heated by passing the electrical current through the thin emitter layer 22. The resonant emissivity of cavity 50, together with the high thermal isolation of membrane 20, maximizes the efficiency with which the Joule power is converted into IR radiation. For example, in one embodiment of the present invention, for an input power of approximately one-tenth of a watt (W) of input power, a radiant power of approximately two $mmW/cm^2$ is achieved on a narrow two-tenths of a micrometer ($\mu$m) spectral band. The design of resonant cavity 50 leads to an emitter 10 having an emissivity of greater than eighty percent (80%). Cavity 50 also promotes constructive interference of the emitted IR radiation. This constructive interference provides spectral content to the emitted radiation.

The IR radiation emitted from membrane 20 may be modulated by supplying time-varying electrical power to IR emitter 10. For example, with a sinusoidally-varying power input, the emitted radiation is sinusoidally modulated. By varying the electrical power at high frequency, IR emitter 10 may exhibit a high frequency response of greater than one hundred hertz. In other words, IR emitter 10 can alternately emit radiation and then stop emitting radiation more than one hundred times a second. Because of this high frequency response, the present invention eliminates the requirement of a mechanical chopper to increase the detectivity of IR emitter 10. This high frequency characteristic of the present invention is made possible because of the ability of membrane 20 to quickly cool down after the electrical current is suspended. This ability to quickly radiate heat away is due to the low thermal mass and high thermal isolation of membrane 20. Once the electrical current has been interrupted or reduced, the faster that membrane 20 can radiate the heat generated by the previous electric current, the faster the electrical current can be restarted or increased to begin another cycle.

Figure 4:
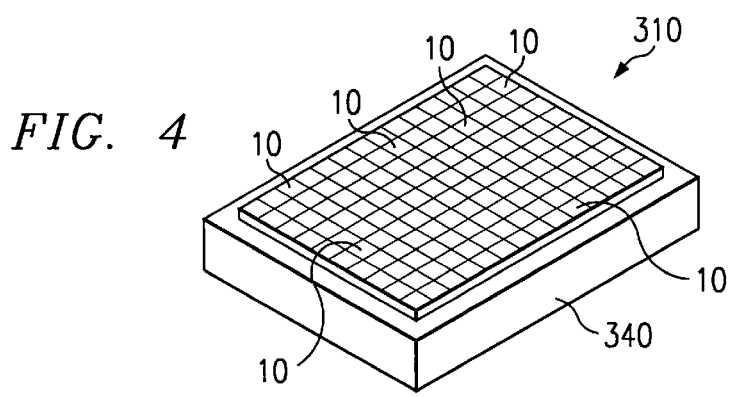
FIG. 4 is a schematic drawing showing an isometric view of an infrared emitter array incorporating teachings of the present invention.

Referring now to FIG. 4, a plurality of IR emitters 10 may be arranged in an array 310. Array 310 may include a substrate 340 that includes embedded electronics, such as an embedded electric power supply (not explicitly shown). In such a configuration, electrical power is supplied to each individual IR emitter 10, as described above. At any given instant, varying amounts of power may be transmitted to each individual emitter 10. For this reason, at a given instant the various emitters 10 may each emit varying amounts of IR radiation. This feature allows a spatial pattern of IR radiation to be emitted. For example, if only the emitters along the diagonals of array 310 have power transmitted to them, an "X" pattern of IR radiation is emitted. Taking this one step further, the pattern of IR radiation emitted can be changed over time to produce a moving pattern. This feature of array 310 may be used to simulate certain scenes and situations that may be used to test an IR detector, for example.

It should be noted that array 310 may include both IR emitters and IR detectors (not explicitly shown). In such a configuration, one or more of the IR emitters produce IR radiation which may be reflected off of a target object. The radiation reflected off the target object may then be received by the IR detectors in the array. Such a hybrid array may be used in a IR detection system that must actively "illuminate" a target object with IR radiation in order to produce an image of that object.

Figure 5:
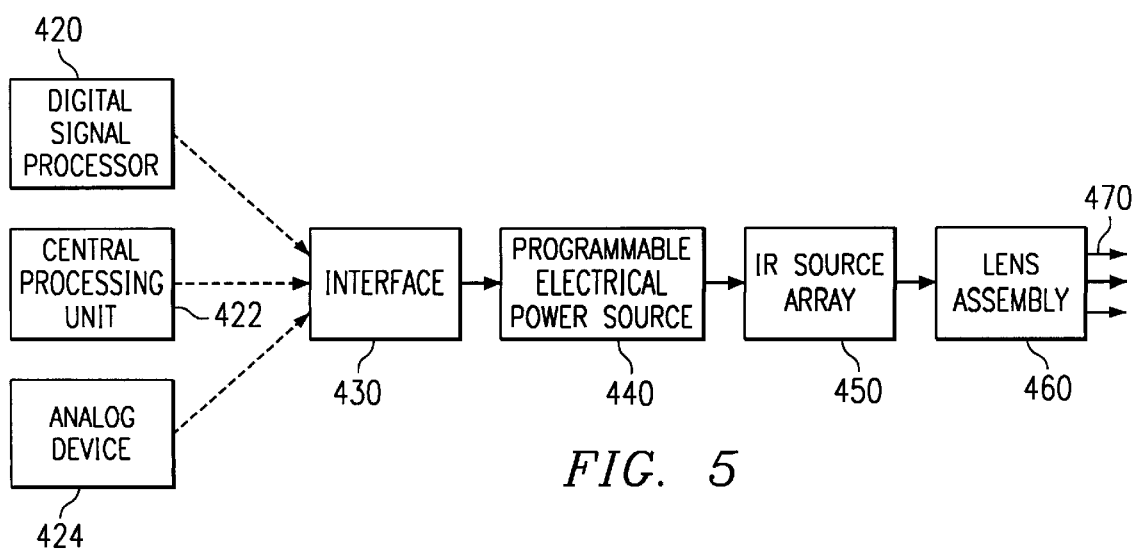
FIG. 5 is a block diagram showing a infrared emission system incorporating the teachings of the present invention.

FIG. 5 is a block diagram showing a infrared emission system 410 incorporating teachings of the present invention. In infrared emission system 410, an input device, such as a digital signal processor 420, a central processing unit 422, or an analog device 424, sends a signal to a programmable electrical power source 440 via an interface 430. This signal instructs power source 440 as to the amount of electrical power to transmit to an IR source 450 at any given instant. For example, power source 440 might be instructed to send a constant amount of electrical power to IR source 450 for a given period of time. Alternatively, power source 440 might be instructed to deliver a sinusoidally varying amount of power over a given interval. Any variation of the magnitude of electrical power over a given time interval is possible.

IR source 450 may be a single IR emitter or an array of IR emitters. Typically, an array of emitters will be used. In such a case, power source 440 is operable to send different amounts of power to each individual IR emitter at any given instant, as described above. The IR radiation emitted by IR source 450 may then be directed through a lens assembly 460. Lens assembly 460 is used to collect the IR radiation emitted from IR source 450 and to redirect that radiation in a columnated fashion. After being emitted by IR source 450 and directed through lens assembly 460, IR radiation 470 is then emitted from IR emission system 410. The emitted IR radiation may have a temporal pattern, created by modulating the IR radiation, and/or a spatial pattern, created by varying the amount of IR radiation emitted by each individual emitter at a given instant.

Infrared emission system 410 may be used in conjunction with an infrared detection system (not explicitly shown). Once IR radiation 470 is emitted from IR emission system 410, it may be transmitted through or reflected by certain objects. The IR detection system may be used to receive IR radiation 470 after it has been reflected by or transmitted through a certain object or objects. The IR radiation can then be used to produce a visual image of the object or objects, among other things. Alternatively, a hybrid IR emitter/detector array, as described above, may be used in place of IR source 450 to create a system that acts as both an IR emitter and an IR detector.

When an IR emission system incorporating the teachings of the present invention is paired with an IR detection system as described above (or when a hybrid IR emitter/detector array is used in place of IR source 450), the IR emission system may be "tuned" to the IR detection system. Such tuning may be accomplished by altering the size of the resonance cavity of each IR emitter so that the wavelengths of the IR radiation emitted fall within the range of wavelengths that the IR detectors can detect. In addition, the amount of electrical power transmitted to each IR emitter may be varied in order to tune the emitters. When the emitter and detectors are tuned, interference from other infrared-radiating sources is greatly reduced.

Although the present invention and its advantages have been described in detail, it should be understood that various changes, substitutions, and alterations can be made therein without departing from the spirit and scope of the present invention as defined by the appended claims.

What is claimed is:

1. An infrared emitter comprising:
   a membrane having a thermal mass sufficiently low to emit infrared radiation modulating at high frequency in response to a modulating electric current passing therethrough;
   a substrate from which the membrane is thermally isolated and over which the membrane is supported in order to form a cavity between the membrane and a top surface of the substrate;
   a pair of conductor arms coupled to the membrane and operable to conduct electrical current to and from the membrane and to thermally isolate the membrane from the substrate; and
   a pair of support legs, each support leg coupled to the substrate at a first end and coupled to a respective conductor arm at a second end, each support leg operable to conduct electrical current from the substrate to a respective conductor arm.

2. The infrared emitter of claim 1 further comprising a reflective surface coupled to the top surface of the substrate.

3. The infrared emitter of claim 1 wherein the membrane comprises:
   an emitter layer operable to emit infrared radiation and having an upper surface and a lower surface;
   an upper insulator layer coupled to the upper surface of the emitter layer; and
   a lower insulator layer coupled to the lower surface of the emitter layer.

4. The infrared emitter of claim 1 wherein the pair of conductor arms each comprise a conductive layer operable to conduct electrical current.

5. The infrared emitter of claim 4 wherein the pair of conductor arms further comprise:
   an upper insulator layer coupled to an upper surface of the conductive layer;
   an emitter layer coupled to a lower surface of the conductive layer; and
   a lower insulator layer coupled to the emitter layer.

6. The infrared emitter of claim 1 wherein the pair of support legs each comprise a conductive layer operable to conduct electrical current.

7. The infrared emitter of claim 6 wherein the pair of support legs further comprise a support layer coupled to the conductive layer.

8. The infrared emitter of claim 1 wherein the substrate further comprises an embedded power source operable to transmit an electric current to the support legs.

9. An infrared emitter array comprising:
   a substrate;
   a plurality of infrared emitters coupled to the substrate, each infrared emitter comprising:
      a membrane having a thermal mass sufficiently low to emit infrared radiation modulating at high frequency in response to a modulating electric current passing therethrough;
      the membrane supported over the substrate in order to form a cavity between the membrane and a top surface of the substrate;
      a pair of conductor arms coupled to the membrane and operable to conduct electrical current to and from the membrane and to thermally isolate the membrane from the substrate; and
      a pair of support legs, each support leg coupled to the substrate at a first end and coupled to a respective conductor arm at a second end, each support leg operable to conduct electrical current from the substrate to a respective conductor arm.

10. The infrared emitter array of claim 9 wherein the substrate further comprises a power source embedded in the substrate.

11. The infrared emitter array of claim 10 wherein the embedded power source is operable to simultaneously transmit varying amounts of electrical current to each infrared emitter.

12. The infrared emitter of claim 9 further comprising a reflective surface coupled to the top surface of the substrate.

13. The infrared emitter of claim 9 wherein the membrane of each of the plurality of infrared emitters comprises:
   an emitter layer operable to emit infrared radiation and having an upper surface and a lower surface;
   an upper insulator layer coupled to the upper surface of the emitter layer; and
   a lower insulator layer coupled to the lower surface of the emitter layer.

14. The infrared emitter of claim 9 further comprising at least one infrared detector operable to receive infrared radiation emitted from the plurality of infrared emitters that has been reflected off of a target object.

15. An infrared emission system comprising:
   infrared radiation source having at least one infrared emitter comprising:
      a multi-layer membrane having a thermal mass sufficiently low to emit infrared radiation modulating at high frequency in response to a modulating electric current passing therethrough;
      a substrate from which the membrane is thermally isolated and over which the membrane is supported in order to form a cavity between the membrane and the substrate;
      a pair of conductor arms coupled to the membrane and operable to conduct electrical current to and from the membrane and to thermally isolate the membrane from the substrate; and
      a pair of support legs, each support leg coupled to the substrate at a first end and coupled to a respective conductor arm at a second end, each support leg operable to conduct electrical current from the substrate to a respective conductor arm;
   a programmable electrical power source operable to transmit an electrical current to the at least one infrared emitter; and
   an input device operable to transmit a signal to the programmable electrical power source indicating the amount of electrical current to be sent to the at least one infrared emitter at any given instant.

16. The infrared emission system of claim 15 further comprising a lens assembly operable to collect and columnate infrared radiation emitted from the infrared source.

17. The infrared emission system of claim 15 wherein the programmable electrical power source is integral with the infrared source.

18. The infrared emission system of claim 15 wherein:
   the infrared source is comprised of a plurality of infrared emitters; and
   the programmable electrical power source is operable to simultaneously transmit varying amounts of electrical current to each infrared emitter.

19. A method of emitting infrared radiation modulating at high frequency comprising:
   providing a membrane comprising an emitter layer;
   suspending the membrane over a substrate such that a cavity is created between the membrane and a top surface of the substrate, and such that the membrane is thermally isolated from the substrate;
   passing an electrical current through the emitter layer to cause the emitter layer to emit infrared radiation; and
   modulating the electrical current passed through the emitter layer at a frequency corresponding with the desired modulation frequency of the infrared radiation.

20. The method of claim 19 wherein the electrical current is sinusoidally modulated.

21. The method of claim 19 wherein the electrical current is modulated by intermittently passing electrical current through the emitter layer during selected discrete time intervals.

22. The method of claim 19 further comprising coupling a reflective surface the top surface of the substrate in the cavity so as to reflect radiation emitted from the emitter layer and entering the cavity.

23. The method of claim 22 wherein the membrane is suspended over the substrate so as to create a cavity sized to reflect infrared radiation having a selected range of frequencies.

24. The method of claim 22 wherein the membrane is suspended over the substrate a distance equal to approximately one quarter of the wavelength of the emitted infrared radiation to create a cavity sized to maximize the amount of infrared radiation produced by the emitter layer within the selected frequency range.

* * * * *